(12) United States Patent
Torbenson

(10) Patent No.: US 12,521,661 B1
(45) Date of Patent: Jan. 13, 2026

(54) FILTER APPARATUSES AND APPROACH

(71) Applicant: RZ Industries LLC, Burnsville, MN (US)

(72) Inventor: Steve Gordon Torbenson, Savage, MN (US)

(73) Assignee: RZ Industries LLC, Burnsville, MN (US)

( * ) Notice: Subject to any disclaimer, the term of this patent is extended or adjusted under 35 U.S.C. 154(b) by 838 days.

(21) Appl. No.: 17/570,147

(22) Filed: Jan. 6, 2022

Related U.S. Application Data

(60) Provisional application No. 63/134,527, filed on Jan. 6, 2021.

(51) Int. Cl.
*B01D 46/00* (2022.01)
*B01D 46/10* (2006.01)
*F24F 13/28* (2006.01)

(52) U.S. Cl.
CPC ......... *B01D 46/0005* (2013.01); *B01D 46/10* (2013.01); *F24F 13/28* (2013.01)

(58) Field of Classification Search
CPC .......... B01D 2275/203; B01D 46/0005; B01D 46/10; F24F 13/28; F24F 8/108
USPC .......................................................... 55/496
See application file for complete search history.

(56) References Cited

U.S. PATENT DOCUMENTS

| | | | | |
|---|---|---|---|---|
| 5,681,630 A * | 10/1997 | Smick | ..................... | A45D 20/12 428/167 |
| 6,152,980 A * | 11/2000 | Culwell | ............... | B01D 46/521 55/501 |
| 7,704,303 B2 * | 4/2010 | Nowak | ..................... | A61L 9/16 96/108 |
| 8,016,921 B2 * | 9/2011 | Hassell | ............. | B01D 46/0002 55/497 |
| 2004/0172928 A1 * | 9/2004 | Kubokawa | ......... | B01D 46/0005 55/497 |
| 2007/0084168 A1 * | 4/2007 | Ashwood | ................ | F24F 13/28 55/501 |
| 2008/0066436 A1 * | 3/2008 | Magee | ................... | B01D 46/02 55/497 |
| 2009/0151312 A1 * | 6/2009 | Ashwood | ................ | F24F 13/28 55/511 |
| 2013/0212990 A1 * | 8/2013 | Albert | .................... | B01D 46/10 156/247 |
| 2016/0263515 A1 * | 9/2016 | Zhang | ................ | B01D 46/0032 |
| 2018/0056224 A1 * | 3/2018 | Barry | ................... | B01D 46/521 |
| 2018/0272263 A1 * | 9/2018 | Gregerson | ......... | B01D 46/0016 |
| 2019/0262754 A1 * | 8/2019 | Barry | ................... | B01D 46/521 |
| 2021/0197112 A1 * | 7/2021 | Barry | ................. | B01D 46/0016 |

(Continued)

*Primary Examiner* — Robert Clemente

(74) *Attorney, Agent, or Firm* — Crawford Maunu PLLC

(57) ABSTRACT

Aspects of the present disclosure are directed to apparatuses and related method involving filters and filtering. As may be implemented in accordance with one or more embodiments, a filter material is configured to filter particulates from air passing through the filter material, and includes an adjustable component to provide two or more sizing configurations of the filter material. Coupling material is configured and arranged to couple a surface of the filter material to an air passage opening of a ventilator apparatus, while facilitating air flow through the filter material and with the air passage opening. The coupling material and filter material are configured for subsequent concurrent removal from the ventilator apparatus.

18 Claims, 8 Drawing Sheets

(56) References Cited

U.S. PATENT DOCUMENTS

2021/0379519 A1\* 12/2021 Barry ................. B01D 46/0016
2023/0089672 A1\* 3/2023 Mok ................. B01D 46/0027
　　　　　　　　　　　　　　　　　　　　55/497

\* cited by examiner

FILTER APPARATUSES AND APPROACH

FIELD

Aspects of various embodiments are directed to filter apparatuses and related approaches for use, manufacture and implementation.

OVERVIEW

Filters are useful for a variety of applications, including personal, residential, commercial and industrial. For instance, filters are often used to filter air for breathing, in the aforementioned applications.

Certain applications involve filtering air provided by a room or area-specific heating, ventilating and/or air conditioning system. As a particular example, hotel and motel rooms are often heated, ventilated and cooled by a room-specific system. Such systems may, for example, utilize a ventilation mechanism that conveys air for heating or cooling the air in a fresh-air or recirculation mode, or simply for bringing fresh air in from outside the room. These room-specific systems often use filters in some manner. However, these filters are susceptible to damage and accumulation of dirt, bacteria and other undesirable contaminants.

These and other matters have presented challenges to the use and implementation of filters for a variety of applications.

Various example embodiments are directed to filters, filter apparatuses, and their implementation, which may address various challenges including those above. In this context, specific embodiments are directed to disposable filter systems that may be implemented with a variety of room-type heating, ventilating and air conditioning (HVAC) systems. In certain embodiments, such disposable filter systems include a filter material and a mechanical engagement system that facilitate engaging the filter with a room HVAC system. Such engagement may be, for example, external to mechanical HVAC equipment and utilized the mechanical engagement system to engage with an outer surface thereof, thus facilitating application to a variety of types of HVAC equipment and which may allow any other filters to remain in place. Specific embodiments are directed to an adjustable filter apparatus, which may be configured to be tailored in size (e.g., by hand) to fit particular types of HVAC equipment. Such tailoring may involve folding and/or removing sections of an adjustable filter.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1A:
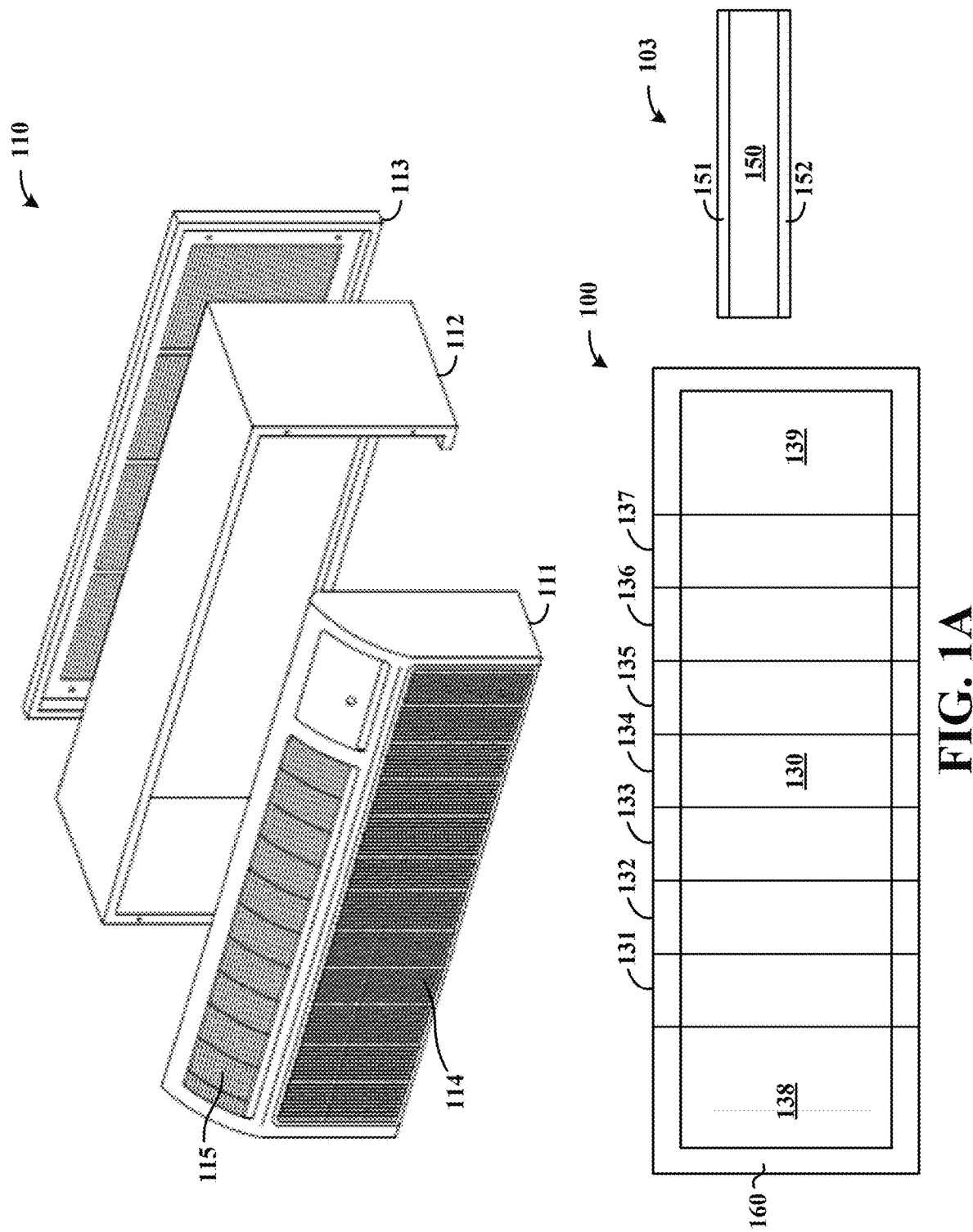
FIG. 1A shows a filter apparatus and an implementation, as may be implemented in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving filters. In certain implementations, aspects of the present disclosure have been shown to be beneficial when used in the context of disposable filters that can be utilized to add temporary filtration for applications such as those involving HVAC equipment in industrial and residential settings and air distribution in vehicles such as automobiles and airplanes. Various aspects are directed to adding such filtration without necessarily modifying the equipment itself or otherwise requiring proprietary componentry. While not necessarily so limited, various aspects may be appreciated through a discussion of examples using such exemplary contexts.

In connection with one or more embodiments, an apparatus includes a filter material configured to filter particulates from air passing through the filter material, and coupling material configured and arranged to couple a surface of the filter material to an air passage opening of a ventilator apparatus. The filter material has an adjustable component configured for providing two or more sizing configurations of the filter material, for instance via removal or folding thereof. The coupling may be achieved while facilitating air flow through the filter material and with the air passage opening. Such an apparatus can address challenges such as those noted above, and may provide a disposable filter that is readily useful for adding sanitary filtration to a ventilation unit. The coupling material may utilize, for example, double-sided tape, or adhering glue-type material coupled to the filter material. In some instances, the coupling material is adhered to the filter material and also passes air for filtering by the filter material. The coupling material may thus also be configured to pass air to facilitate filtering of the air by the filter material.

Certain embodiments are directed to a filter apparatus, its use and/or manufacture. The filter apparatus has an adjustable perforated tear-away system that allows the user to adjust the size of the filter apparatus according to a particular make, model and specific manufacturer of ventilation equipment to which the filter apparatus is to be applied. This can facilitate implementation without the need to have a custom specific sized filter for the equipment to which the filter apparatus is provided.

In various implementations, the filter material has a first region having a fixed filter area, and a second region that is separable from the first region and having a further filter area adjacent the fixed filter area. The first and second regions sharing a boundary at a reduced-strength portion of the filter material. The coupling material is coupled to a portion of the second region and to a portion of the first region, and the second region of the filter material is configured and arranged with the coupling material in at least one removable portion. The at least one removable portion is separable from the first region to facilitate adjusting a total filter area size of the apparatus. The coupling material coupled to the portion of the first region is configured to couple the first region to a surface of the ventilator apparatus adjacent the opening with the first region covering the opening. In certain applications, the coupling material coupled to the portion of the second region is configured to couple the filter material over an opening without utilizing the coupling material coupled to the portion of the first region.

In certain embodiments, the apparatus has a surface area defined by coplanar portions of the coupling material and filter material. The coupling material may include a removable portion configured for separating from a remaining portion of the coupling material and therein reducing the surface area of the apparatus.

The filter material may include a removable portion. In this or other contexts, the coupling material may be coupled to the removable portion and another portion of the filter material.

In some embodiments, the coupling material is configured and arranged to pass air to facilitate filtering of the air by the filter material, and the filter and coupling materials are configured and arranged in a plurality of removable portions.

Various embodiments are directed to methods of filtering. In some embodiments, a method includes providing filter material with an adjustable component, and sizing the filter material via removal of the adjustable component (or a portion thereof). The sized filter material may be coupled to an air passage opening of a ventilator apparatus by adhering a surface of the filter material to an external surface of the ventilator apparatus adjacent an air passage opening with a coupling material. The filter material may then be used to filter air flowing through the air passage.

In some implementations, the filter material is coupled to the ventilator apparatus by providing the filter material with a first region having a fixed filter area and a second region separable from the first region and having a further filter area adjacent the fixed filter area. The first and second regions share a boundary at a reduced-strength portion of the filter material, with coupling material coupled to a portion of the second region and to a portion of the first region. A filter area size of the apparatus is adjusted by removing at least one removable portion of the second region. The coupling material is used to couple the first region to a surface of the apparatus adjacent the opening with the first region covering the opening.

In some implementations, the apparatus has a surface area defined by coplanar portions of the coupling material and filter material. The filter material is coupled to the air passage opening by removing a removable portion of the filter material utilizing a reduced-strength portion of the filter material at an intersection between the removable portion and another portion of the filter material, and therein reducing the surface area of the apparatus.

Various embodiments are directed to manufacturing a filter apparatus. In a particular embodiment, a filter material is provided with an adjustable component to facilitate setting the size of the filter material. The filter material is configured to filter particulates from air passing through the filter material. Coupling material is coupled to the filter material, and configured to couple a surface of the filter material to a surface area of a ventilator apparatus adjacent an air passage opening thereof, while facilitating air flow through the filter material and with the air passage opening.

In some implementations, the filter material has a first region having a fixed filter area, and a second region that is separable from the first region and having a further filter area adjacent the fixed filter area. The first and second regions share a boundary at a reduced-strength portion of the filter material. The coupling material is coupled to the filter material by coupling an adhesive to a portion of the second region and to a portion of the first region. The second region of the filter material is configured with at least one removable portion separable from the first region to facilitate adjusting a total filter area size of the apparatus.

In certain embodiments, providing filter material and coupling a coupling material thereto includes defining a surface area of a filter apparatus with coplanar portions of the coupling material and filter material. The coupling material may be configured with a region of reduced strength to provide a removable portion configured for separating from a remaining portion of the coupling material and therein reducing the surface area of the apparatus.

Referring to the Figures, FIG. 1A shows a filter apparatus 100 and a corresponding ventilation apparatus 110 for coupling thereto. The ventilation apparatus includes a front unit 111, wall sleeve 112 (e.g., for extending through a wall in a home, hotel or industrial application), and external filter grille 113. A variety of types of HVAC equipment may be utilized within the sleeve 112, such as for proving air conditioning, heating, air exchange, or a combination thereof. The front unit 111 may include an air intake 114 and an air discharge 115. The filter apparatus 100 is configured for coupling to the air intake 114 or air discharge 115, to provide filtration of air moved by the ventilation apparatus 110. Further, various embodiments as characterized herein may be applicable to other ventilation apparatuses, as may be used for example with automotive vents, airplane vents, hospital vents, and more.

The filter apparatus 100 includes filter media 130 and may be implemented utilizing a variety of adaptable filters. In one embodiment, the filter apparatus 100 as shown includes a foldable regions 131-137, extending between end regions 138 and 139. These foldable regions may be folded in upon one another to set a width of the filter media 130. Adhesive (coupling) material 160 may be provided around a perimeter of the filter media 130, and may be utilized to adhere the folds to one another and to adhere the filter apparatus 100 to an opening such as intake 114. Other adaptable filters that may be used are exemplified in further figures, with similar folds.

The filter apparatus 100 may be utilized to adhere to and filter air passing through the intake 114 and/or discharge 115. For instance, the width of the filter apparatus 100 may be sized via the folds to fit the intake 114 or discharge 115. The width of the filter apparatus 100 may thus be implemented to suit particular applications. In certain embodiments, fewer or more foldable regions may be used relative to that as shown.

In some implementations, an adhesive may be coupled to the filter material 130 and adhered thereto, and further used to adhere the filter material to the ventilation apparatus 110. The adhesive may be removable relative to the ventilation apparatus 110, for instance such that it is permanently adhered to the filter material 130 and temporarily adhered to the ventilation apparatus (e.g., for a short hotel stay). For instance, two-sided tape with a stronger adherence to the filter material and a weaker adherence to the ventilation apparatus may be used in this context.

Figure 1B:
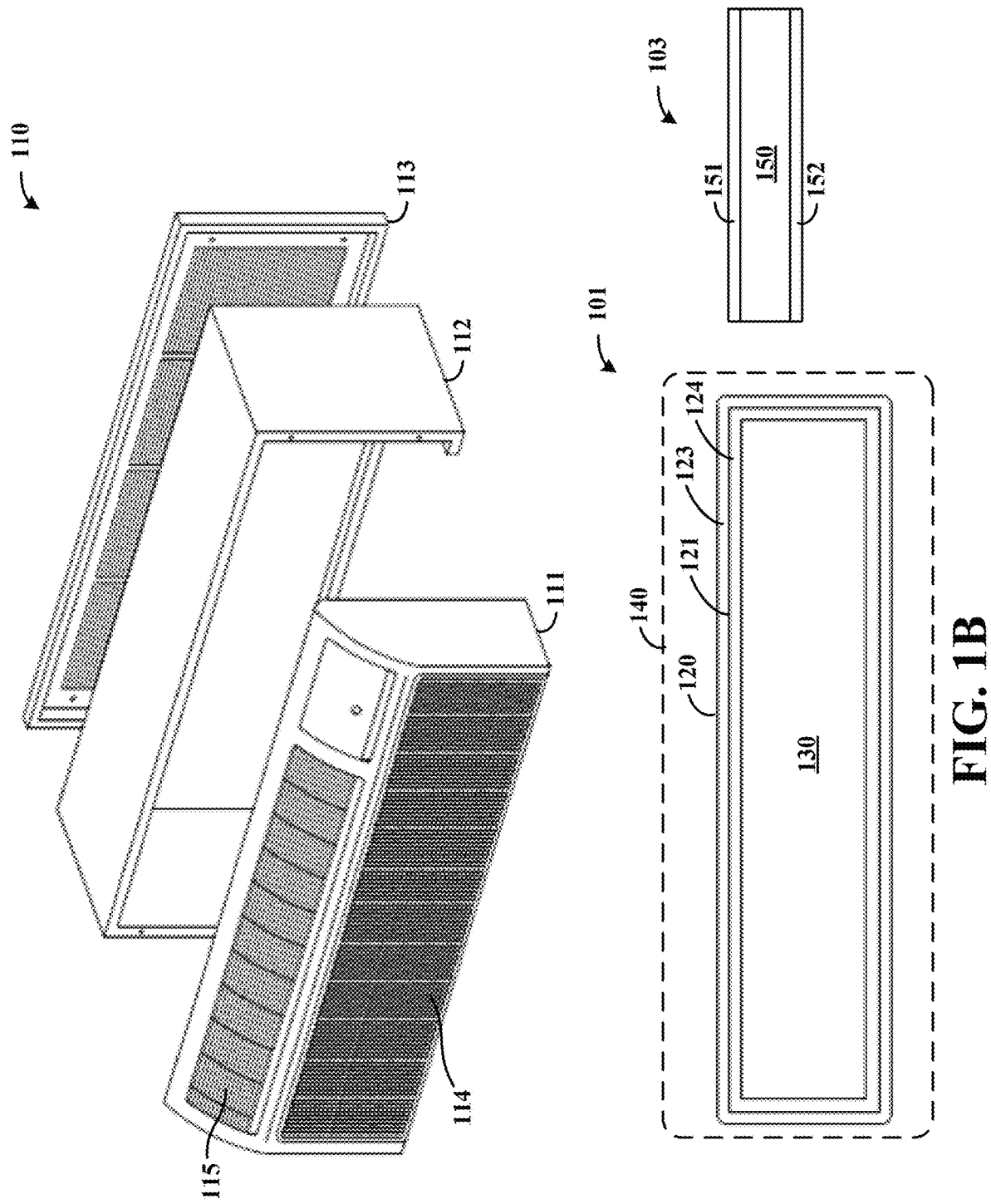
FIG. 1B shows a filter apparatus and an implementation, in accordance with FIG. 1A and utilizing adjustable filter componentry, as may be implemented in accordance with one or more embodiments.

FIG. 1B shows another filter apparatus 101 as applicable to a corresponding ventilation apparatus 110 for coupling thereto, as also shown in FIG. 1A. The filter apparatus 101 may be implemented utilizing a variety of adaptable filters. In one embodiment, the filter apparatus 101 as shown includes a detachable region 120 extending around a perimeter 121 at which the detachable region may be separated, and a filter media 130 within the perimeter 121. Adhesive (coupling) material 123 and 124 may be provided around the perimeter 121, on both the detachable region 120 and a region inside the perimeter 121 and round the filter media 130. Other adaptable filters that may be used are exemplified in further figures, as may be used for application to a variety of vent or opening types including that shown in FIGS. 1A and 1B.

The filter apparatus 101 may be utilized to adhere to and filter air passing through the intake 114 and/or discharge 115. For instance, the perimeter 121 may be sized to fit the discharge 115, and an outer perimeter (and width) of the detachable region 120 may be sized to fit the intake 114. The perimeter 121 and width of the detachable region 120 may thus be implemented to suit particular applications. In certain embodiments, additional detachable regions, as represented by region 140, may be implemented with the filter apparatus 101. Additional adhesive may also be similarly placed thereon.

In some implementations, an adhesive may be coupled to the filter material 130 and adhered thereto, and further used to adhere the filter material to the ventilation apparatus 110. The adhesive may be removable relative to the ventilation apparatus 110, for instance such that it is permanently adhered to the filter material 130 and temporarily adhered to the ventilation apparatus (e.g., for a short hotel stay). For instance, two-sided tape with a stronger adherence to the filter material and a weaker adherence to the ventilation apparatus may be used in this context.

In some implementations, adhesive material as characterized herein may be applied after sizing of an adjustable filter apparatus. For instance, where adhesive is desirably applied to a limited region within an outer perimeter, such an adhesive may be applied after setting a desired outer perimeter size by removing detachable regions. Referring to an embodiment represented by cross-sectional view 103 as shown in both FIGS. 1A and 1B, adhesive material 150 is provided with opposing surfaces covered with a removable material at 151 and 152, such as a coated material that adheres to the adhesive in a manner that allows easy removal of the coated material. For application, the removable material (e.g., 152) may be removed from one of the opposing surfaces to expose the adhesive, after which the adhesive may be applied to the sized filter, for instance to provide adhesive 123 or 124. Once applied, the removable material (e.g., 151) may be removed from the other side of the adhesive, providing a surface for adhering the filter apparatus for use, such as for adhering to the intake 114 or discharge 115. Accordingly, the covered adhesive material 150 may be provided in a roll or other form, which may be cut or otherwise detached to size. Referring to side view 103, the adhesive material may include openings 161, 162 and 163 (or more) that facilitate air flow through the adhesive and for filtering via filter media coupled thereat.

In some embodiments, the filter apparatus shown in FIG. 1B includes an adhesive formed around a perimeter thereof, at a particular width. Removable strips of non-permanent adhering type material (e.g., wax paper-like) can be lightly adhered to the adhesive such that individual ones of the strips may be removed to expose the adhesive. With this approach, the filter apparatus can be utilized for subsequent coupling to more than one HVAC type unit. For instance, a small (e.g., ¼") strip of adhesive may be exposed for coupling to an HVAC type unit. After removal, another such strip may be exposed for coupling to another such unit. In this context, a single filter may be used multiple times, such as by a traveler staying at multiple hotels.

Figure 2:
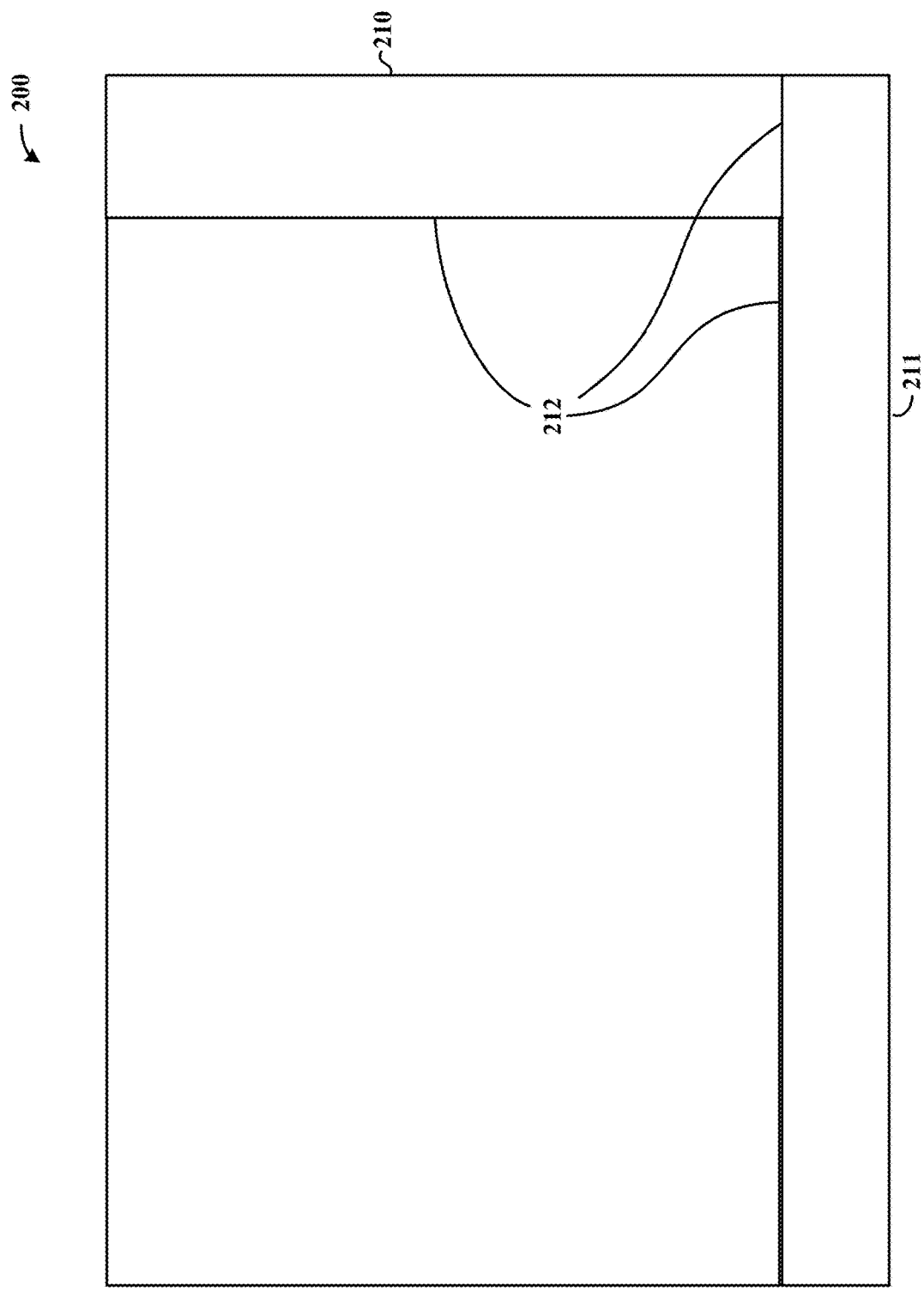
FIG. 2 shows a configurable filter apparatus, as may be implemented in accordance with one or more embodiments.

FIG. 2 shows a filter apparatus 200 having removable and/or foldable portions 210 and 211 on two sides, facilitating tailoring of the overall surface area of the filter apparatus. This approach may involve, for example, using removable (non-adhering) material to expose an adhesive surface. This approach may also involve using a perforation or other weakening structure 212 at the shown intersections to facilitate complete removal of outer edges of the filter apparatus, or folding of the outer edges.

Figure 3:
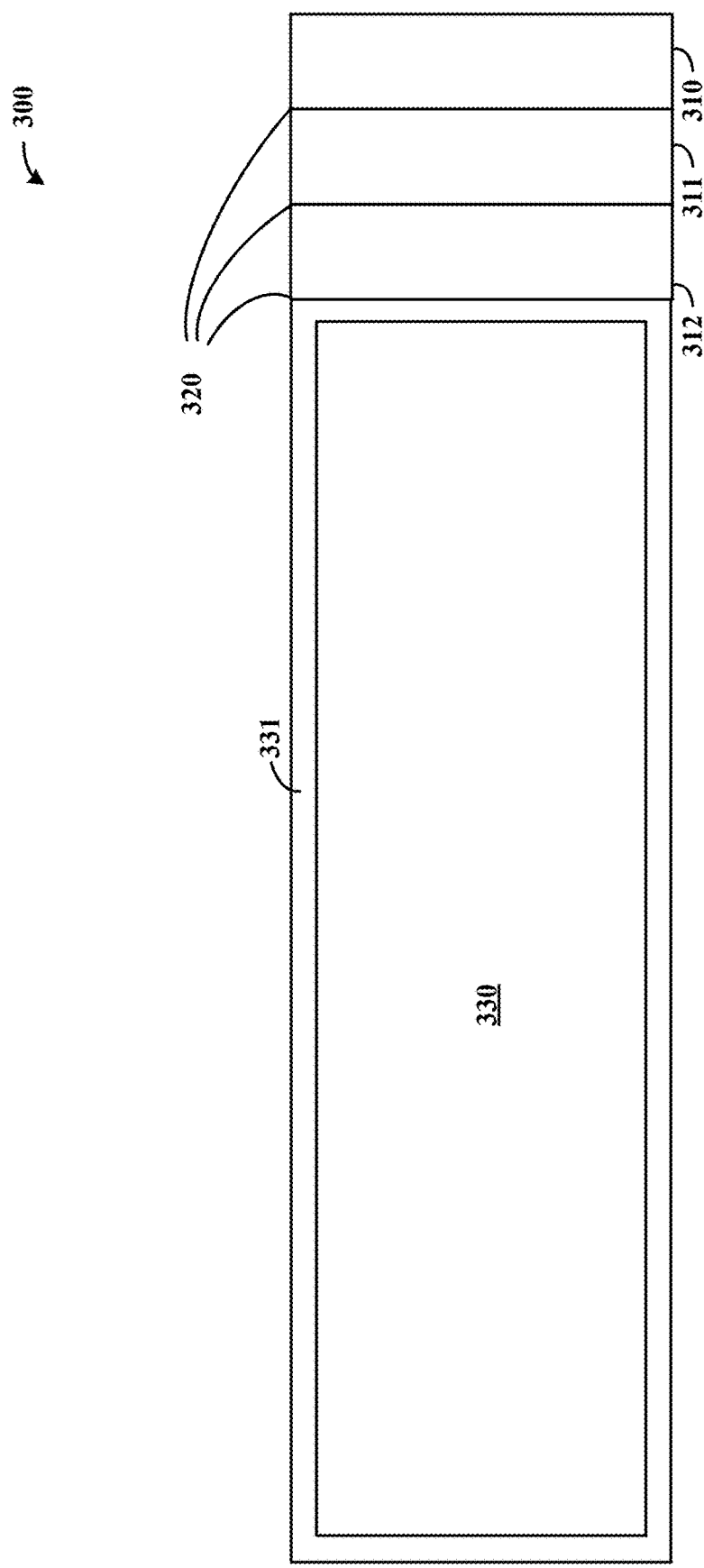
FIG. 3 shows a configurable filter apparatus, as may be implemented in accordance with one or more embodiments.

FIG. 3 shows another filter apparatus 300 with removable and/or foldable portions 310, 311 and 312 coupled for removal from a filter media 330. In this embodiment, filter portions facilitate reduction in width of the filter apparatus. Perforated/weakened portions 320 may be provided as shown, to facilitate removal and/or folding of the removable portions. Adhesive 331 may be placed adjacent a perimeter of the filter media 330. Further embodiments may include multiple removable/foldable portions on multiple sides, such as two or more such portions relative to FIG. 2.

Figure 4:
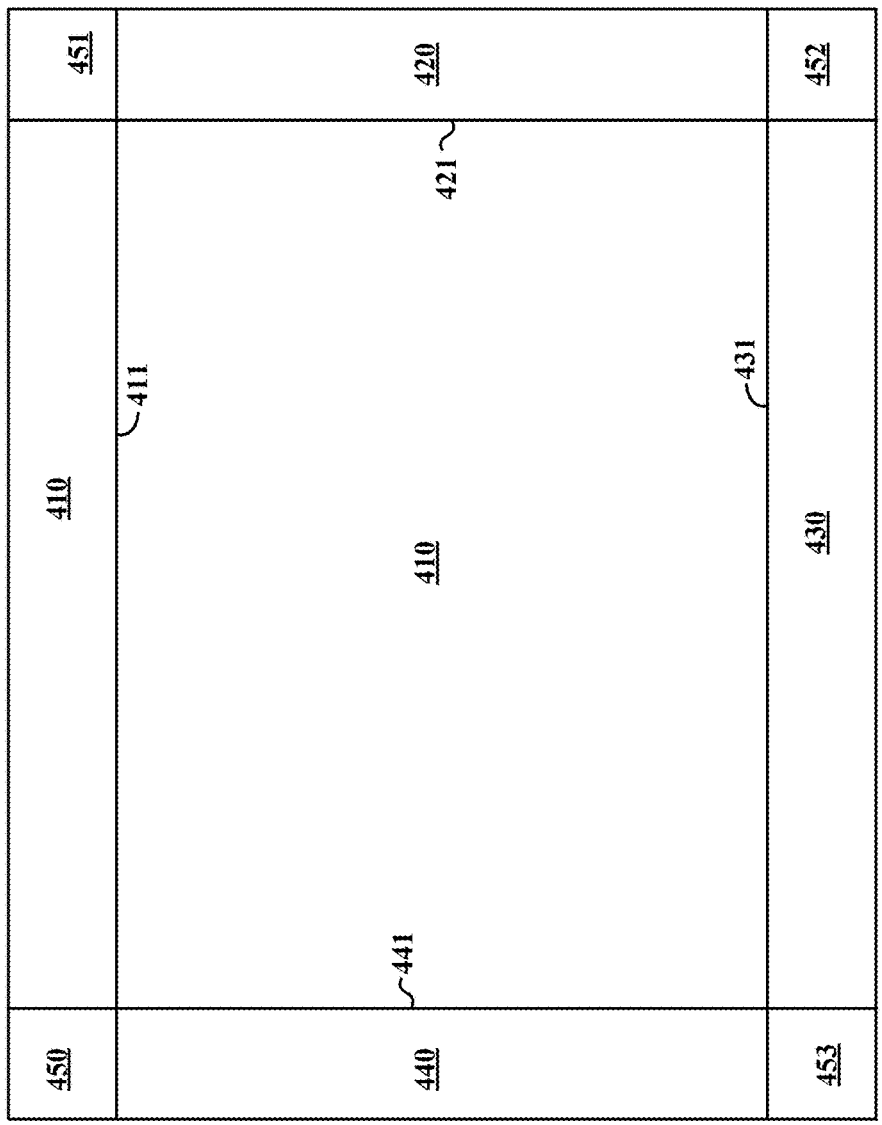
FIG. 4 shows a filter apparatus 400 with a filter media 410 surrounded by removable portions that facilitate sizing of the filter apparatus in both height and width.

FIG. 4 shows a filter apparatus 400 with a filter media 410 surrounded by removable portions that facilitate sizing of the filter apparatus in both height and width. Specifically, removable portions 410, 420, 430 and 440 are respectively coupled along a perimeter of the filter media 410 and may be individually removed along lines 411, 421, 431 and 441 (e.g., weakened portions). Corner portions 450, 451, 452 and 453 are also removable to correspond to removal of one or both of the respective removable portions adjacent thereto.

Figure 5:
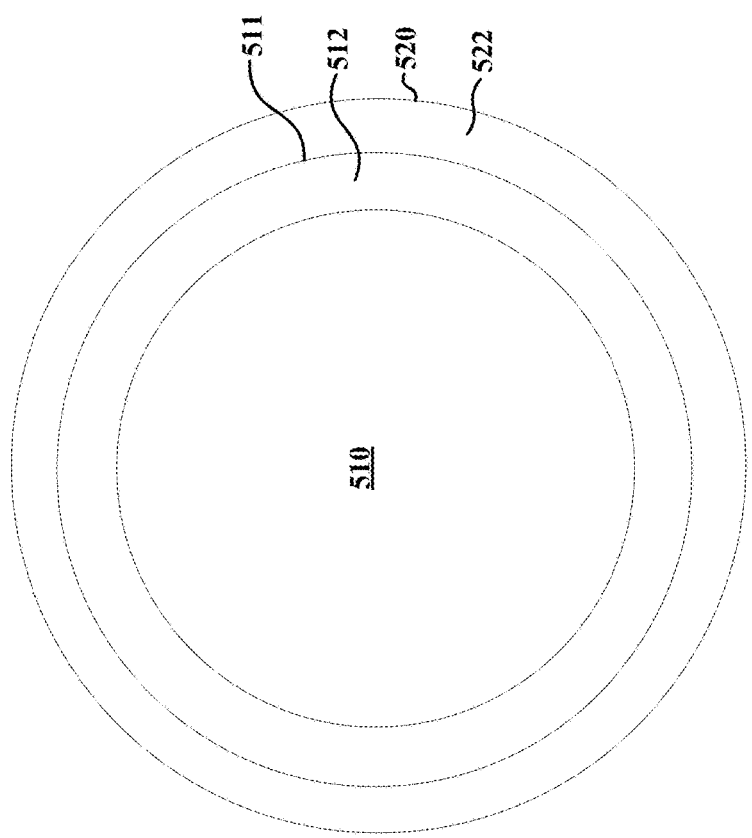
FIG. 5 shows a filter apparatus as may be implemented in accordance with one or more embodiments.

FIG. 5 shows a filter apparatus 500, as may be implemented in accordance with one or more embodiments. The filter apparatus 500 includes filter media 510 and a detachable region 520 for adjusting the size thereof, detachably coupled to perimeter 511. Adhesive 512 and 522 may be located as shown, with adhesive 512 inside perimeter 511 and adhesive 522 on the detachable region 520. The filter apparatus 500 may, for example, be implemented in a manner similar to that depicted with FIG. 1B and with circular intakes and exhausts, such as may be applicable in airplanes, automobiles, as well as home or industrial HVAC systems.

Figure 6:
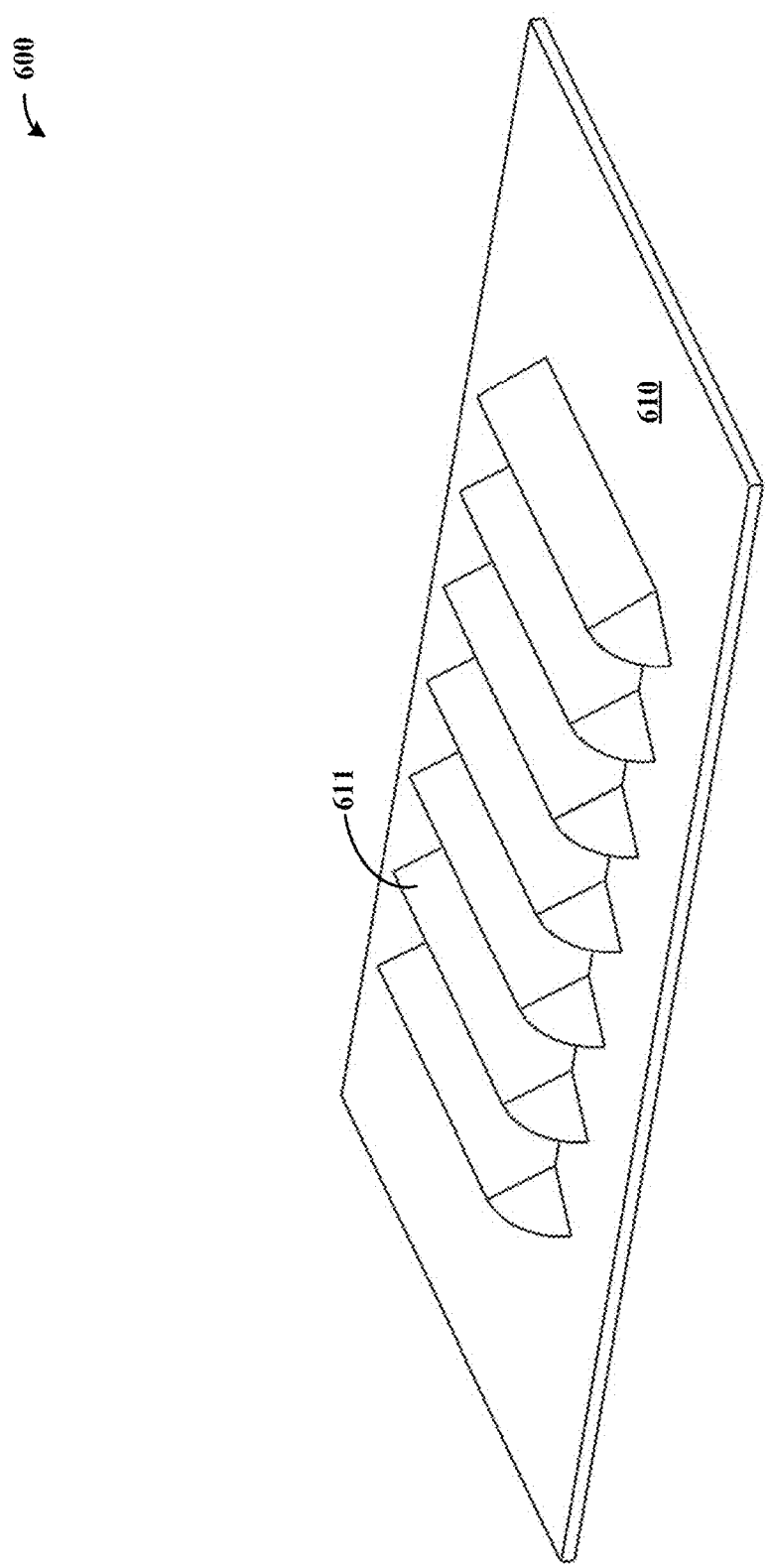
FIG. 6 shows a filter media apparatus having a relatively flat filter media material and a plurality of filter media pleats, as may be implemented in accordance with one or more embodiments.

FIG. 6 shows a filter media apparatus 600 having a relatively flat filter media material 610 and a plurality of filter media pleats, including pleat 610. The pleats may be operable to increase the total surface area of the filter media, for instance with air flowing into the pleats from a backside (underneath, as shown). The filter media apparatus 600 and pleats may be applied to one or more of a variety of embodiments herein, such as those shown in the other figures (e.g., for application for an HVAC unit as shown in FIG. 1B). Further, the pleats 611, or similar pleat structures, may be implemented with differently-shaped filters such as circular (e.g., in FIG. 5), oblong, elliptical, and square. Further, rounded pleats, square pleats, and pleats having varied shapes may be utilized in a similar manner.

Figure 7:
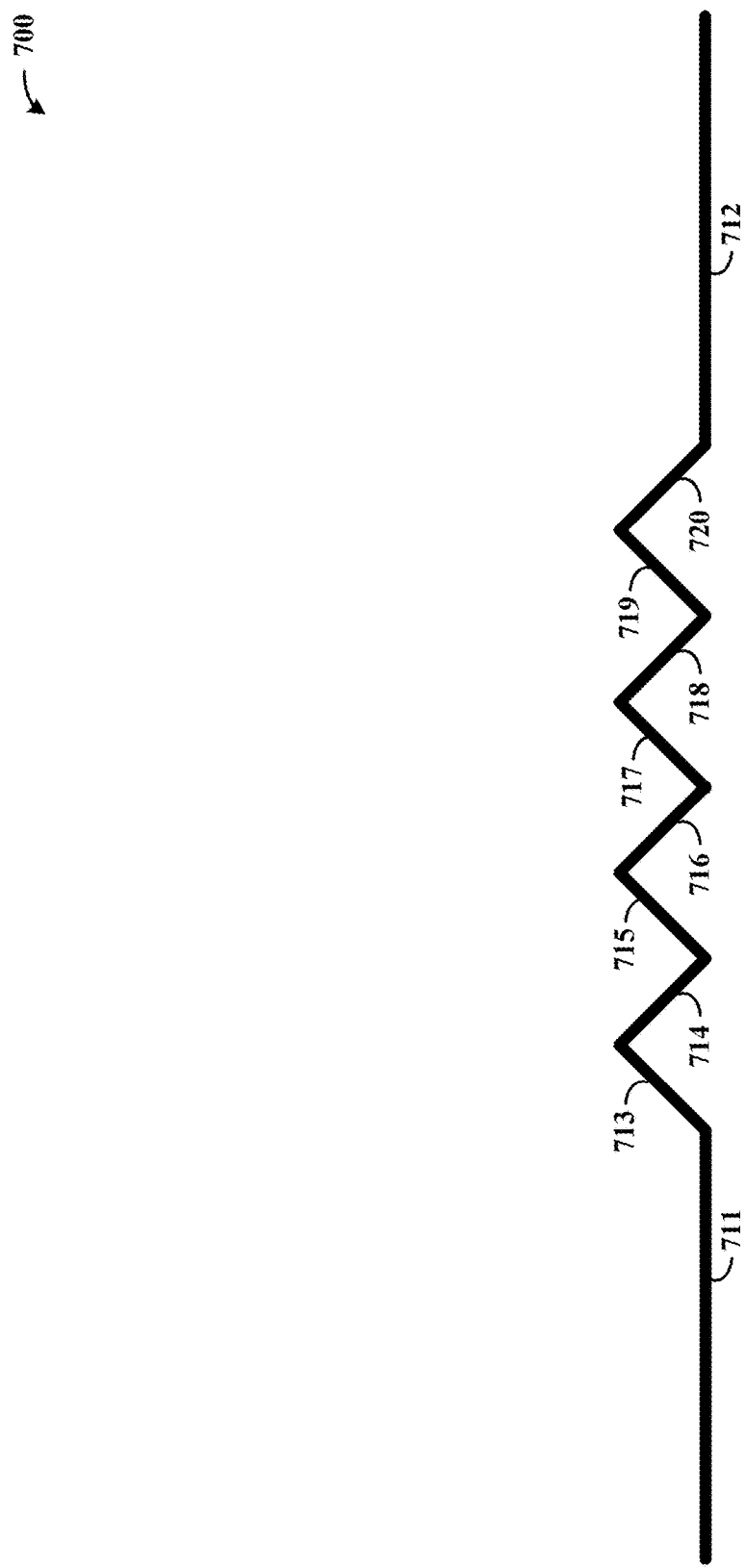
FIG. 7 shows a foldable filter apparatus, as may be implemented in accordance with one or more embodiments.

FIG. 7 shows a side view of a foldable filter apparatus 700, as may be implemented in accordance with one or more embodiments. The apparatus 700 includes a filter media 710 having end regions 711 and 712 coupled by a plurality of fold regions 713-720. The apparatus 700 may, for example, be implemented in a manner similar to the apparatus 100 shown in FIG. 1A (from a front view perspective), and apparatus 100 may exhibit a similar side view.

Based upon the above discussion and illustrations, those skilled in the art will readily recognize that various modifications and changes may be made to the various embodiments without strictly following the exemplary embodiments and applications illustrated and described herein. For example, various types of filter attachment componentry and filter materials can be used, in addition to and/or in alternative to those listed. Filter sizing and adjustability may be tailored for particular applications. For instance, embodiments characterizing folding may be implemented with removable sections instead, and embodiments characterizing removal may be implemented with folding instead. In addition, the various embodiments described herein may be combined in certain embodiments, and various aspects of individual embodiments may be implemented as separate embodiments. The embodiments shown in the figures and/or as described herein may be implemented together, or certain components characterized with particular embodiments may be used separately. Such modifications do not depart from the true spirit and scope of various aspects of the invention, including aspects set forth in the claims.

What is claimed is:

1. An apparatus comprising:
   a filter material configured to filter particulates from air passing through the filter material, and having an adjustable component configured for providing two or more sizing configurations of the filter material; and
   coupling material configured and arranged to couple a surface of the filter material to an air passage opening of a ventilator apparatus by coupling to both the filter and to the ventilator apparatus, while facilitating air flow through the filter material and with the air passage opening, the coupling material and filter material being configured for subsequent concurrent removal from the ventilator apparatus, the coupling material being configured and arranged with the filter material to provide respective configurations of the filter and coupling material in which the coupling material is confined to a perimeter region of the filter in each configuration, by:
      in a first one of the sizing configurations having a first perimeter, adhering the coupling material to a first perimeter surface region of the filter extending along the first perimeter with a central surface region of the filter within the first perimeter surface region being devoid of the coupling material; and
      in a second one of the sizing configurations having a second perimeter that is greater than the first perimeter, adhering the coupling material to a second perimeter surface region of the filter extending along the second perimeter with a central surface region of the filter within the first perimeter surface region being devoid of the coupling material.

2. The apparatus of claim 1, wherein
   the filter material has foldable regions, each foldable region configured for folding upon another one of the foldable regions to set the size of the filter material; and
   wherein the coupling material is configured and arranged with the filter material to couple the filter material to a surface of the ventilator apparatus adjacent the opening with the filter material covering the opening and at least two of the foldable regions folded upon one another.

3. The apparatus of claim 1, wherein
   the filter material has a first region having a fixed filter area, and a second region that is separable from the first region and having a further filter area adjacent the fixed filter area, the first and second regions sharing a boundary at a reduced-strength portion of the filter material;
   the coupling material is coupled to a portion of the second region and to a portion of the first region;
   the second region of the filter material is configured and arranged with the coupling material in at least one removable portion, the at least one removable portion being separable from the first region to facilitate adjusting a total filter area size of the apparatus; and
   wherein the coupling material coupled to the portion of the first region is configured and arranged to couple the first region to a surface of the ventilator apparatus adjacent the opening with the first region covering the opening.

4. The apparatus of claim 3, wherein the coupling material coupled to the portion of the second region is configured and arranged to couple the filter material over an opening without utilizing the coupling material coupled to the portion of the first region.

5. The apparatus of claim 1, wherein the coupling material is configured and arranged to pass air to facilitate filtering of the air by the filter material.

6. The apparatus of claim 1, wherein:
   the apparatus has a surface area defined by coplanar portions of the coupling material and the filter material; and
   the coupling material includes a removable portion configured for separating from a remaining portion of the coupling material and therein reducing the surface area of the apparatus.

7. The apparatus of claim 1, wherein the filter material includes a removable portion, the coupling material being coupled to the removable portion and another portion of the filter material.

8. The apparatus of claim 1, wherein:
   the coupling material is configured and arranged to pass air to facilitate filtering of the air by the filter material; and
   the filter material and the coupling material are configured and arranged in a plurality of removable portions.

9. A method comprising:
   providing an apparatus including filter material having an adjustable component configured for providing two or more sizing configurations of the filter material;
   setting a size of the filter material by folding a portion of the adjustable component, including providing one of respective configurations of the filter and coupling material in which the coupling material is confined to a perimeter region of the filter in each configuration, by:
      for a first one of the sizing configurations having a first perimeter, providing the coupling material adhered to a first perimeter surface region of the filter extending along the first perimeter with a central surface region of the filter within the first perimeter surface region being devoid of the coupling material; and for a second one of the sizing configurations having a second perimeter that is greater than the first perimeter, providing the coupling material adhered to a second perimeter surface region of the filter extending along the second perimeter with a central surface region of the filter within the first perimeter surface region being devoid of the coupling material;

after setting the size of the filter material, coupling the filter material to an air passage opening of a ventilator apparatus by adhering a surface of the filter material to an external surface of the ventilator apparatus adjacent an air passage opening with a coupling material; and using the filter material to filter air flowing through the air passage.

10. The method of claim 9, wherein providing and coupling the filter material include:

providing the filter material with foldable regions configured to fold upon adjacent ones of the foldable regions for setting a size of the filter material;

adjusting a filter area size of the apparatus by folding at least one of the foldable regions upon another one of the foldable regions; and using the coupling material to couple the filter material to a surface of the apparatus adjacent the opening with the first region covering the opening.

11. The method of claim 9, further including providing and using the coupling material to pass air to facilitate filtering of the air by the filter material.

12. The method of claim 9, wherein:

the apparatus has a surface area defined by coplanar portions of the coupling material and the filter material; and coupling the filter material to the air passage opening includes folding a foldable portion of the filter material utilizing a reduced-strength portion of the filter material at an intersection between the foldable portion and another portion of the filter material, and therein reducing the surface area of the apparatus.

13. The method of claim 9, further including, after setting the size of the filter material, applying an adhesive adjacent a perimeter of the filter material, wherein coupling the filter material to the air passage opening includes utilizing the applied adhesive to couple to the air passage opening and, therein, to couple the filter to the air passage opening.

14. A method of manufacturing a filter apparatus, the method comprising:

providing a filter material configured to filter particulates from air passing through the filter material, including providing the filter apparatus with foldable portions configured to, upon folding of one of the foldable portions upon another portion of the filter material, provide an adjusted size of the filter material; and coupling, to the filter material, coupling material configured and arranged to couple a surface of the filter material to a surface area of a ventilator apparatus adjacent an air passage opening thereof by coupling to both the filter material and to the ventilator apparatus, while facilitating air flow through the filter material and with the air passage opening, including configuring the filter material and the coupling material to provide respective configurations of the filter and coupling material in which the coupling material is confined to a perimeter region of the filter in each configuration, including:

in a first one of the sizing configurations having a first perimeter, providing the coupling material adhered to a first perimeter surface region of the filter extending along the first perimeter with a central surface region of the filter within the first perimeter surface region being devoid of the coupling material; and in a second one of the sizing configurations having a second perimeter that is greater than the first perimeter, providing the coupling material adhered to a second perimeter surface region of the filter extending along the second perimeter with a central surface region of the filter within the first perimeter surface region being devoid of the coupling material.

15. The method of claim 14, further including removing the filter material along a fold of the foldable portion.

16. The method of claim 14, wherein the filter material has a plurality of foldable regions sharing a boundary with adjacent ones of the foldable regions at a reduced-strength portion of the filter material;

wherein coupling the coupling material to the filter material includes coupling an adhesive to a portion of the second perimeter surface region and to a portion of the first perimeter surface region; and further including folding at least one of the foldable regions to facilitate adjusting a total filter area size of the filter material.

17. The method of claim 14, wherein providing the filter material and coupling the coupling material thereto includes defining a surface area of the filter apparatus with coplanar portions of the coupling material and the filter material; and further including configuring the coupling material with a region of reduced strength to provide a foldable portion configured for folding upon another portion of the coupling material and therein reducing the surface area of the filter apparatus.

18. The method of claim 9, wherein setting the size of the filter material includes removing the filter material along a fold of the folded portion of the adjustable component.

* * * * *